United States Patent [19]

Puri

[11] Patent Number: 4,756,932
[45] Date of Patent: Jul. 12, 1988

[54] PROCESS FOR MAKING HIGHLY PERMEABLE COATED COMPOSITE HOLLOW FIBER MEMBRANES

[75] Inventor: Pushpinder S. Puri, Macungie, Pa.

[73] Assignee: Air Products and Chemicals, Inc., Allentown, Pa.

[21] Appl. No.: 61,237

[22] Filed: Jun. 11, 1987

[51] Int. Cl.$^4$ .................... B05D 3/107; B05D 3/12
[52] U.S. Cl. .................... 427/175; 427/177; 427/245; 427/354; 427/393.5; 427/434.7
[58] Field of Search .............. 427/175, 177, 245, 354, 427/393.5, 434.7

[56] References Cited

U.S. PATENT DOCUMENTS 4,214,020  7/1980  Ward et al. .................... 427/296
4,444,662  4/1984  Conover .................... 210/500

Primary Examiner—Bernard D. Pianalto
Attorney, Agent, or Firm—Mark L. Rodgers; William F. Marsh; James C. Simmons

[57] ABSTRACT

The present invention is a process for applying a highly permeable coating on a hollow fiber substrate. The hollow fiber substrate is continuously passed through a polymeric coating solution and withdrawn from the solution through a coating die to form a uniform polymeric solution coating on the outer surface of the hollow fiber. A portion of the solvent from the coating is allowed to evaporate thereby forming a thin, dense surface layer after which the remaining solvent from the coating layer is leached out. The resultant material is a highly permeable, coated composite hollow fiber membrane which can be used in gas and/or liquid separations.

26 Claims, 1 Drawing Sheet

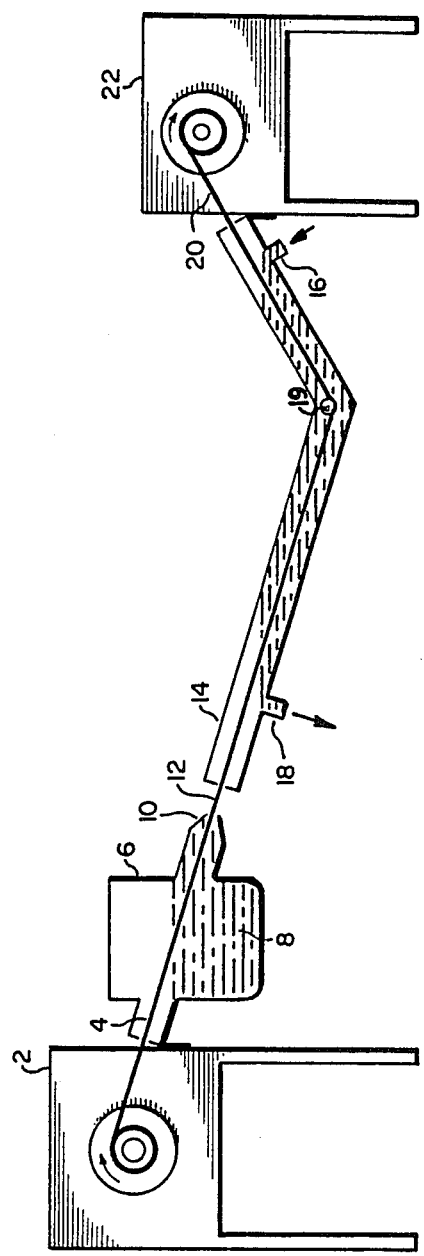

4,756,932

PROCESS FOR MAKING HIGHLY PERMEABLE COATED COMPOSITE HOLLOW FIBER MEMBRANES

TECHNICAL FIELD

The present invention relates to applying highly permeable coatings on hollow fiber substrates to form composite membranes.

BACKGROUND OF THE INVENTION

The coating of hollow fiber substrates with a polymer to make a composite membrane structure has generally been achieved by immersing the hollow fiber substrate in a pool of low viscosity and generally very dilute solution of a polymer in a volatile solvent. The hollow fiber substrate is the withdrawn and air-dried to form a film. Low viscosity coating solutions are typically used because high viscosity solutions tend to form non-uniform coatings on the substrate surface. When low viscosity solutions are used for coatings, the polymer concentrate is not large enough to form a continuous film on a substrate with high porosity and large pore sizes due to shrinkage of the polymer coating. To achieve a good film, the substrate must be coated several times in succession or a vacuum must be applied on the bore side of the substrate so that by loss of solvent in the vicinity of the membrane wall, an increased solution concentration (and, hence viscosity) is obtained to form a desired film. The multiple coating approach yields films that are very thick and offers substantial resistance to mass transfer of the permeating component. In the vacuum method, thin coatings are achieved; however, this method must be practiced in a batch mode because discrete sections of fibers must be used to achieve vacuum through the bore. Both of the above methods fail to give uniform coatings when polymeric solutions having high viscosity and low solid contents are used.

U.S. Pat. No. 4,214,020 discloses a process for coating the exteriors of a plurality of hollow fibers which are suitable for fluid separations and which are assembled in the form of a bundle. The process involves immersing the bundle of hollow fibers in a coating liquid containing material suitable for forming the coating and a substantial amount of solvent. A pressure drop from the exteriors to the interiors of the hollow fibers is provided to result in the formation of deposits on the exteriors of the hollow fibers. The process enables essentially the entire exterior surface of the hollow fibers to be coated without undue sticking of the hollow fibers and avoids the formation of undesirably thick coatings on the hollow fibers in any portion of the bundle. While the disclosed process is capable of treating a bundle of fibers simultaneously, the process nonetheless is still a batch process, and is not operated as a continuous, on-line process.

U.S. Pat. No. 4,444,662 discloses a laminate formed by the solvent casting of a two-phase siloxane-polyarlyene polyether block copolymer onto a suitable microporous substrate, such as a micro-porous propylene film, to produce a gas permeable and blood compatible membrane having sufficient mechanical strength for use in blood oxygenators and gas separation devices. The process for producing the laminate consists of a meniscus dip coating technique to apply a uniform coating of the polymer to only one side of the micro porous substrate in order to maintain adequate coating thickness and to leave the other side uncoated for ease of heat sealing or potting of the membranes together into envelopes.

SUMMARY OF INVENTION

The present invention is a continuous process for applying a generally uniform, highly permeable coating on a hollow fiber substrate to produce a composite hollow fiber membrane. The process comprises passing a hollow fiber substrate, at fixed tension and fixed speed, into a polymeric solution capable of forming a permeable coating on the hollow fiber substrate. The hollow fiber substrate is then removed from the polymeric solution by axially drawing it through a coating die such that a polymer solution coating is formed on the substrate surface by axial annular drag flow. A portion of the polymer solution coating is allowed to evaporate, thereby forming a thin, dense layer at the surface of the coating. The coated hollow fiber is subsequently immersed in a liquid bath to leach the solvent from the coated polymer solution film to form a highly permeable, coated composite hollow fiber.

The present invention provides for continuously coating hollow fiber substrates at a given speed and pre-determined tension to produce essentially defect-free, highly permeable, coated composite membranes. Additionally, the present invention has the ability to form ultra-thin, defect-free barrier layers over irregular, defect containing, microporous hollow fibers. The external surface of the hollow fibers can be coated using high viscosity solutions with low solids contents. The total coating thickness can be controlled by simply changing the mechanical design of the coating die, while the thickness of the dense film can be controlled by varying the air drying (evaporation) time.

BRIEF DESCRIPTION OF THE DRAWING

The single figure of the accompanying drawing is a schematic diagram for carrying out one embodiment of the present invention.

DETAILED DESCRIPTION OF THE INVENTION

The present invention is a process for applying a highly permeable coating on a hollow fiber substrate to produce a composite hollow fiber membrane. Referring to the single figure of the accompanying drawing, a hollow fiber substrate 4 is continuously unwound from a delivery spool mechanism 2 and taken up on a receiving spool mechanism 22 at a predetermined, fixed tension and a pre-determined fixed speed. By regulating the tension and the speed, a fixed tension differential results in the fiber substrate during the coating process which is essential to counter swelling and/or shrinkage of the substrate which generally occurs when a membrane is immersed in a pool of leaching solvent without precise control of the membrane tension during coating. The hollow fiber substrate can be any suitable material which can be a component of a composite membrane, and is preferable a micro-porous polymeric material such as CELGARD fibers available from the Celanese Corporation.

As the hollow fiber substrate 4 is unwound from the delivery spool mechanism 2, it is passed into a reservoir 6 containing a polymeric solution 8 capable of forming a permeable coating on the hollow fiber substrate 4. The polymeric solution 8 can be any solution which does not adversely react with or affect the fiber. It is preferred that the polymeric solution have a low solids concentration, i.e., less than 15% and have a viscosity within the range of 100–25,000 centipoise at room temperature, although these parameters are not critical to the operation of this invention. particularly well suited polymeric solutions include one or more solvents containing polymeric materials selected from the group consisting of polysulfones, polyacrylonitriles, polycarbonates, polyarylethers, polyolefins, polyacetylenes and substituted derivatives thereof. Generally, however, any polymer solution (i.e. polymer dope) which can result in a permeable coating can be use in this process.

The hollow fiber 4 is passed through the polymeric solution 8 contained in the reservoir 6, and is removed from the solution 8 by axially drawing it through a coating die or jet 10 in fluid communication with the reservoir 6 and containing the polymeric solution 8. The motion of the hollow fiber entrains the polymer solution 8 and draws it through the die 10 thus causing an axial annular drag flow resulting in a uniform polymer coating on the surface of the hollow fiber. Generally, the thickness of the polymer solution coating can be determined by knowing the ratio of the diameter of the hollow fiber to the orifice opening of the coating die 10 and the power law index of the polymer solution. Although the thickness of the coating on the hollow fiber substrate is not critical, a thickness between 0.1–100 microns is generally preferred. In addition to being passed through the solution itself, the polymeric solution coating may be applied to the hollow fiber substrate by a number of equivalent techniques, for example, by a metered pump device, by a spray mechanism, etc., prior to being passed through the die. The important criteria in the application of the coating solution is that the solution is applied in sufficient amount to the total outer surface of the substrate.

In most embodiments, subsequent to removing the coated hollow fiber substrate 12 from the reservoir, a portion of the polymeric solution coating on the substrate is evaporated such that the surface of the coating forms a thin, dense layer. This evaporation step allows the polymeric solution coating to form a thin dense layer on the hollow fiber substrate. Evaporation may be carried out in any suitable manner, although simply air drying the coated substrate for typically thirty seconds or less after it is removed from the polymeric solution 8 is usually preferred. Only a portion of the polymeric solution is evaporated in order to form a thin layer coating, and the short period of time required for this step allows it to be carried out in a continuous, on-line manner. The thin, dense layer formed at the surface of the polymeric coating can vary widely depending upon the coating used and evaporation time, although typically it is preferred that this layer be between 200–10000 angstroms thick. In some embodiments, the particular combination of substrate and coating employed may not require an evaporation step to form a highly permeable coating. In these instances, the above described evaporation step can be eliminated from the overall process.

After the short evaporation period, if used, the coated hollow fiber 12 is immersed in a leaching bath to extract the solvent from the polymer solution coating. In a preferred mode, a leaching liquid is passed through a tube or passageway 14 through which the coated hollow fiber 12 is passed. The leaching liquid enters the passageway 14 through inlet 16 and is preferably passed counter-directional to the hollow fiber, and is withdrawn from the passageway through outlet 18. An important criteria in the design of the leaching bath (tube) is that the location of the first contact surface of the fiber after its entry into the leaching bath, i.e., the friction-free roller 19, is such that the coating has coagulated fully by the time it is contacted, so that no damage is done to the coating. The leaching liquid can be any suitable liquid which is a non-solvent for the polymer, but miscible with the solvent in which the polymer solution is made. For many applications water is the preferred leaching liquid. During the leaching step there is a simultaneous mass transfer of non-solvent into the solution and of the solvent into the non-solvent phase in which the solvent is miscible. When the non-solvent enters the solution phase, or when a substantial loss of solvent has occurred, the polymer solution becomes thermodynamically unstable and splits into two phases, a polymer-rich and solvent-rich phase. This phase inversion, followed by subsequent nucleation and growth of the polymer network results in a porous sublayer being formed under a dense, thin layer. Thus, by leaching the solution coating in an appropriate non-solvent, a dense layer supported on a porous substructure is formed on the hollow fiber substrate.

Coatings of a similar nature can also be formed by other methods such as a "dry" process and by thermal gelatin. these processes are described in the published literature; e.g. Kesting, R. E., Asymmetric Membranse, *Synthetic Polymeric membranes* (1985). These processes can employ polymeric solutions having up to 50% solids content.

The coated hollow fiber 20 is removed from the passageway 14 and, if necessary, air dried for a short period of time, prior to being continuously wound onto a take-up spool via a take-up spool mechanism 22. While air drying is typically preferred, any other suitable drying technique, such as solvent exchange be used.

The process of the present invention provides for the continuous, on-line coating of hollow fibers to make highly permeble, composite hollow fiber membranes which can be used in a variety of gas and/or liquid separation processes. Polymeric coating solutions having high viscosities and low solids content can be applied in a single step to make generally defect-free coated composite membranes. The present process is also advantageous in that the coating thickness can be controlled by simply changing the mechanical design of the coating die, and the thickness of the dense film can be controlled by varying the air drying time.

The following example illustrates the present invention and is not meant to be limiting.

EXAMPLE 1

The process of the present invention was carried out to apply an asymmetric coating of poly(trimethylsilylpropyne) on a polypropylene micro-porous hollow fiber (Celgard ®X-20 hollow fiber membrane) to make a composite hollow fiber membrane. A 3% w/w solution of the poly(trimethylsilylpropyne) was made in tetrahydrofuran and coated on a Celegard ® hollow fiber with an external diameter of about 0.45 mm.

The coating jet had an internal diameter of 1.4 mm, thus giving a ratio of fiber diameter/orifice diameter of 0.32. The fiber unwind speed was about 7 ft/min at a 7 g tension. The coated film was allowed to evaporate at room temperature, 23° C., for 14 sec and then coagulated in water, also at room temperature, for about 67 seconds. The water circulation rate through the leaching tube was about 3 gal/hr. The water-wet coated membrane was taken up on a receiving spool at a fixed tension of 7 g. The coated composite fibers were allowed to dry in air.

A microscopic examination of the coated composite membrane showed a defect-free dense layer on the surface of the membrane. Examination of a cross-section of the fiber showed that the total coating thickness varied between 15–25 μm. Scanning Electron Photomicrograph examinations confirmed the formation of a porous structure with a dense layer on the surface of the coating.

The coated fibers were gathered in the form of a bundle and potted to make a membrane module. The permeation properties of the coated fibers were tested using pure oxygen and nitrogen at 25 psig gas pressure and room temperature (23° C.). The coated membranes had an oxygen and nitrogen permeance of $136 \times 10^{-5}$ and $98 \times 10^{-5}$ cm$^3$/(sec)(cm$^2$)(cm Hg), respectively, thus giving an O$^2$ to N$^2$ selectivity of 1.4.

EXAMPLE 2 (COMPARATIVE)

In a second experiment, Celgard ®X-20 fibers were coated using similar procedures but instead of quenching the coating in water, it was allowed to dry in air following the conventional coating process. For similar coating and testing conditions, the coated membranes had an oxygen and nitrogen permeance of $53 \times 10^{-5}$ and $37 \times 10^{-5}$ cm$^3$/(sec)(cm$^2$)(cm Hg), respectively, once again giving an O$_2$ to N$_2$ selectivity of 1.4. The identical selectivities obtained in the two cases confirm that the quality of the coating formed in the two cases is similar. However, in the process disclosed in this invention, the gas permeances obtained were almost 2.5 times greater than those observed by employing a coating process without a solvent leaching step.

Having thus described the present invention, what is now deemed appropriate for the Letter patent is set out in the following appended claims

1. A continuous process for applying a generally uniform, highly permeable coating on a hollow fiber substrate to produce a coated composite hollow fiber membrane, said process comprising:
    (a) passing a hollow fiber substrate, at both fixed tension and speed, into a polymeric solution capable of forming a permeable coating on the hollow fiber substrate;
    (b) removing said hollow fiber substrate from the polymeric solution by axially drawing said substrate through a coating die such that a polymer solution coating is formed on the substrate surface by axial annular drag flow;
    (c) evaporating a portion of the polymer solution coating such that the surface of said solution coating forms a thin, dense layer;
    (d) subsequently immersing said coated hollow fiber substrate in a leaching bath; and
    (e) drying the coated hollow fiber substrate.

2. A process in accordance with claim 1 wherein said polymeric solution contains less than about 15% solids.

3. A process in accordance with claim 1 wherein said polymer solution coating on the hollow fiber substrate, after drying, has a thickness between 1–50 microns.

4. A process in accordance with claim 1 wherein said thin, dense surface layer of the coating has a thickness between 200–10000 angstroms.

5. A process in accordance with claim 1 wherein said polymeric solution comprises a solvent containing a polymeric material selected from the group consisting of polysulfones, polyacrylonitriles, polycarbonates, polyacetylenes polyarylethers, polyolefins, and substituted derivatives thereof.

6. A process in accordance with claim 1 wherein said polymeric solution has a viscosity between 100–25,000 centipoise at room temperature.

7. A process in accordance with claim 1 wherein said hollow fiber substrate is a micro-porous polymeric material.

8. A process in accordance with claim 1 wherein said hollow fiber substrate is initially unwound at a fixed tension and speed from a spool in a continuous, on-line process.

9. A process in accordance with claim 1 wherein said coated hollow fiber substrate is removed from the leaching bath and continuously wound on a take-up spool.

10. A process in accordance with claim 9 wherein said coated hollow fiber substrate is air dried after being removed from the leaching bath and prior to being wound on the take-up spool.

11. A process is accordance with claim 9 wherein said coated hollow fiber substrate is air dried after being wound on the take-up spool.

12. A process in accordance with claim 1 wherein said coated hollow fiber substrate is dried using a solvent exchange technique.

13. A continuous process for applying a generally uniform, highly permeable coating on a hollow fiber substrate to produce a coated composite hollow fiber membrane, said process comprising:
    (a) passing a hollow fiber substrate, at both fixed tension and speed, into a polymeric solution capable of forming a permeable coating on the hollow fiber substrate;
    (b) removing said hollow fiber substrate from the polymeric solution by axially drawing said substrate through a coating die such that a polymer solution coating is formed on the substrate surface by axial annular drag flow;
    (c) subsequently immersing said coated hollow fiber substrate in a leaching bath; and
    (d) drying the coated hollow fiber substrate.

14. A process in accordance with claim 13 wherein said polymeric solution contains less than about 15% solids.

15. A process in accordance with claim 13 wherein said polymer solution coating on the hollow fiber substrate, after drying, has a thickness between 1–50 microns.

16. A process in accordance with claim 13 wherein said thin, dense surface layer of the coating has a thickness between 200–10000 angstroms.

17. A process in accordance with claim 13 wherein said polymeric solution comprises a solvent containing a polymeric material selected from the group consisting of polysulfones, polyacrylonitriles, polycarbonates, polyacetylenes, polyarylethers, polyolefins, and substituted derivatives thereof.

18. A process in accordance with claim 13 wherein said polymeric solution has a viscosity between 100–25,000 centipoise.

19. A process in accordance with claim 13 wherein said hollow fiber substrate is a micro-porous polymeric material.

20. A process in accordance with claim 13 wherein said hollow fiber substrate is initially unwound at a fixed tension and speed from a spool in a continuous, on-line process.

21. A process in accordance with claim 13 wherein said coated hollow fiber substrate is removed from the leaching bath and continuously wound on a take-up spool.

22. A process in accordance with claim 21 wherein said coated hollow fiber substrate is air dried after being removed from the leaching bath and prior to being wound on the take-up spool.

23. A process is accordance with claim 21 wherein said coated hollow fiber substrate is air dried after being wound on the take-up spool.

24. A process in accordance with claim 13 wherein said coated hollow fiber substrate is dried using a solvent exchange technique.

25. A process in accordance with claim 1 wherein the highly permeable coating is an asymmetric structure.

26. A process in accordance with claim 13 wherein the highly permeable coating is an asymmetric structure.

* * * * *